Oct. 5, 1954   K. AURBACH   2,690,872
ACCUMULATOR SHUTTER AND RESET LEVER INTERLOCK
Filed Sept. 26, 1950   2 Sheets-Sheet 1

Inventor:
Kurt Aurbach
BY Knight Bros
ATTORNEYS

Patented Oct. 5, 1954

2,690,872

UNITED STATES PATENT OFFICE 2,690,872

ACCUMULATOR SHUTTER AND RESET LEVER INTERLOCK

Kurt Aurbach, Bielefeld, Germany, assignor to Anker-Werke, A. G., Bielefeld, Germany, a corporation of Germany Application September 26, 1950, Serial No. 186,867

Claims priority, application Germany January 21, 1950

2 Claims. (Cl. 235—130)

My invention relates to cash registers, adding machines, accounting machines or the like and, more particularly, to the totalizing and item counting apparatus for such business machines.

In known computing business machines, the indicating members of the adding or totalizing mechanisms are usually covered by a key-locked lid or shutter so that the sum or balance can be read or the mechanism be reset to zero only by means of a special key. For machines with item counters, it is also known to place the shutter of the totalizing indicator into such a relation to the item counters that the counters can be reset to zero only when the shutter is in the open position for reading or resetting the adding mechanisms. To this end, the item counter reset mechanism has a key hole for a removable turn key, and the key hole is accessible only when the sum indicator shutter is unlocked and opened.

It is an object of my invention to improve the totalizer and item-counter apparatus of computing business machinery by eliminating the separate turn key for resetting the item counters and providing a design of small space requirements in which the reset means for the item counters are a fixed part of the machinery yet safely locked against unauthorized operation.

According to the invention, a manually operable reset member for zeroing the item counters is normally latched in its inactive position and is released for resetting movement only when the normally closed and key-locked shutter of the totalizing indicator is unlocked and placed into uncovering position. According to another feature of the invention, the latch for the item-counter zeroing device is controlled by a mechanism which links the latch with the shutter and includes a spring coupling so as to permit returning the reset member of the item-counter zeroing device to its inactive position even after the indicator shutter is returned to the closed position or locked in that position.

Figure 1:
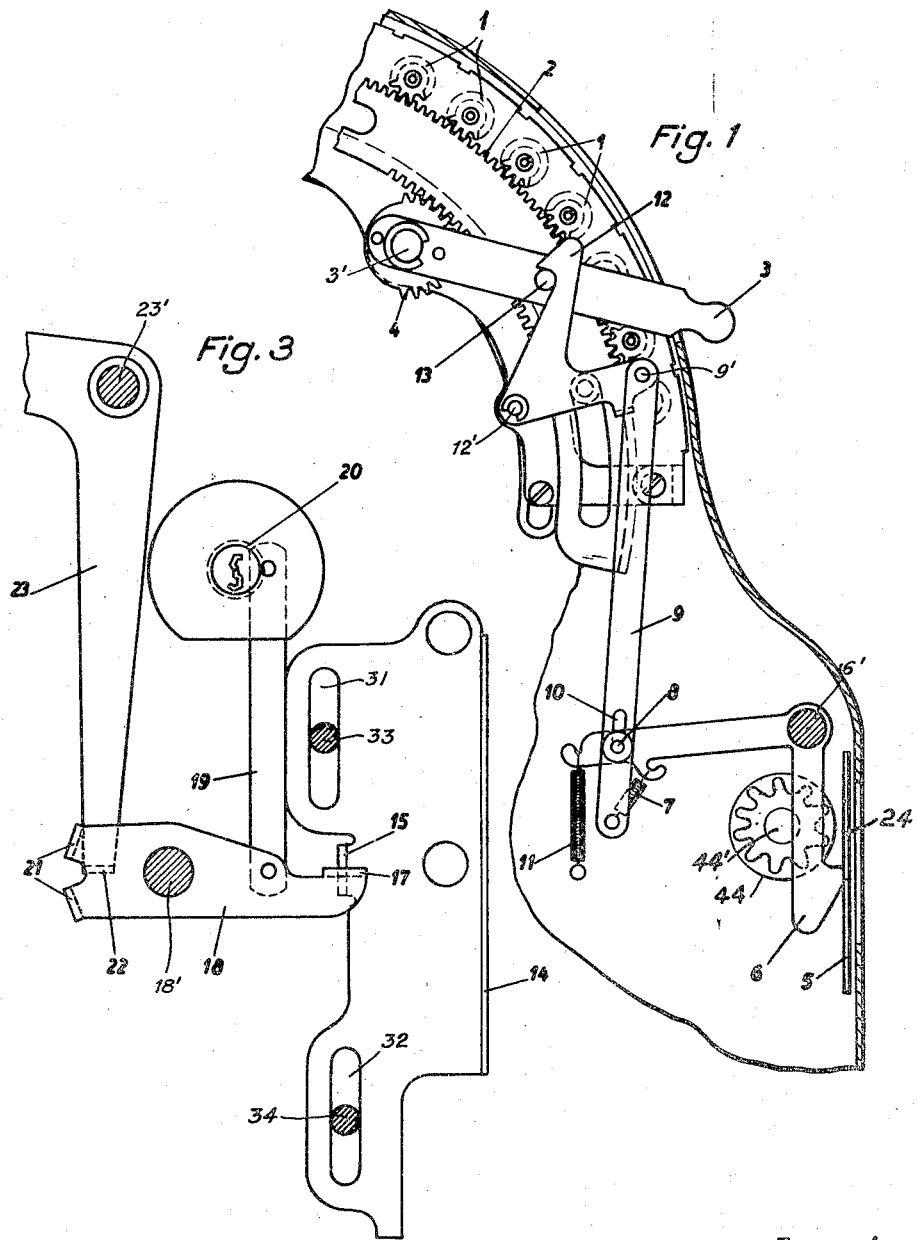
Figure 2:
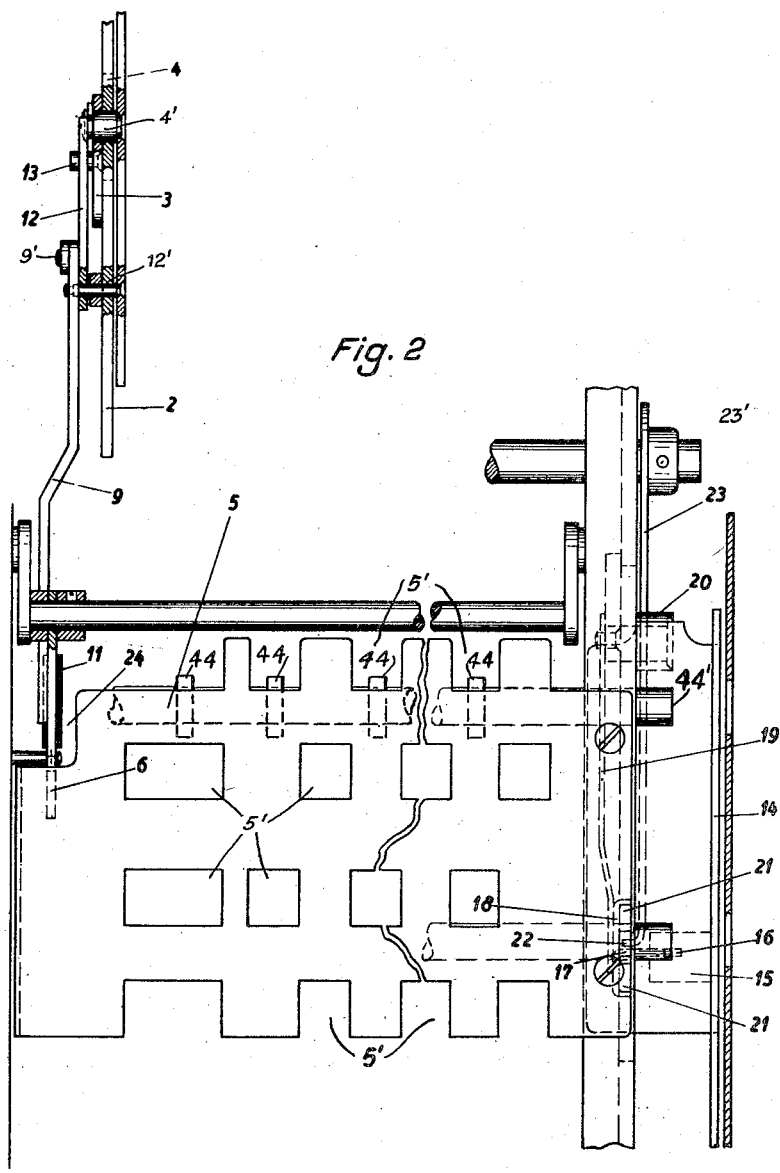

These and more specific objects and features of the invention will be apparent from the following description of the embodiment exemplified by the drawing, in which Figure 1 is a side view of apparatus according to the invention, Fig. 2 is a front view, and Fig. 3 is a side view of details of the same apparatus.

The illustrated apparatus forms part of a cash register or other computing business machine which has mechanisms for adding the registered amounts and indicating the total on a group of number wheels. The indicating number wheels 44 revolvable on a shaft 44' are normally covered by a lockable shutter 5 so that the total amount can be read only when the shutter is unlocked and opened. The shutter consists of a plate with window openings such as those denoted by 5'. When the shutter plate 5 is in the illustrated position, it covers and conceals the indicators 44 which, seen from the viewer's place, lie behind the plate 5 in Fig. 2. When the shutter plate 5 is lowered from the illustrated position, the indicated amounts appear behind the openings 5' and can be read. While only one horizontal row of number wheels 44 is shown in Fig. 2, it should be understood that further rows are provided to be exposed through the lower rows of openings 5' when plate 5 is lowered.

The machine is further equipped with item counters which advance one step for each item to be registered. Several such counters are usually provided for selection by corresponding machine keys so that, for instance, different item counters can be used for sales in respectively different departments of a store. These item counters can be reset to zero and, for this purpose, have respective reset wheels or gears. In Fig. 1, the item counters are denoted by 1, and it will be seen that their respective reset gears are all in meshing engagement with a rack member 2. Upward movement of member 2 controls all item counters to return to zero position. Such movement can be imparted to the rack member by a reset arm 3 pivoted on a pin 3'. Arm 3 is accessible and operable from the outside, and, when unlatched, can be moved up from the illustrated position and then causes a spur gear 4 on pin 3' to displace the rack member 2 accordingly.

Normally, however, the reset arm 3 is latched in the illustrated position and is released for operation only after the above-described shutter plate 5 is unlocked and moved downward into position to uncover the totalizing indicator. To this end, the shutter plate 5 cooperates with one arm of an angular lever 6, pivoted at 6', whose other arm is linked to a pull rod 9 by a coupling spring 7 and by a pin 8 passing through an elongated hole 10 of rod 9. Lever 6 is biased by a spring 11 which tends to move a nose of lever 6 against the shutter plate 5. Consequently, when plate 5 is in the illustrated closed position, the arm 6 abuts against the shutter as shown in Fig. 1, but when the shutter plate 5 is lowered into the open position, the spring 11 biases arm 6 to move its nose through an opening on marginal recess 24 (Fig. 2) of the shutter plate, thus turning the arm 6 counterclockwise from the position shown in Fig. 1 and shifting the pull rod 9 downward. Rod 9 is linked, at 9', to a latch lever 12, pivoted at 12', which is engageable with a locking pin 13 of the reset arm 3. While latch 12 and pin 13 normally prevent actuation of arm 3, it will be recognized that the downward displacement of pull rod 9, caused by the downward opening movement of the shutter 5, will unlatch the reset arm 3, thus permitting it to be actuated for zeroing the item counters.

The shutter plate 5 is firmly secured to a slider 14 which is vertically displaceable and has guide slots 31, 32 traversed by respective stationary guide pins 33, 34. Slider 14 has a bent projection 15 with a slit 16. A bent nose 17 of an arm 18 passes through the slit 15. Arm 18 is pivoted at 18' and is joined by a link member 19 with the revolvable drum portion of a key lock 20. Two mutually spaced projections 21 bent from arm 18 coact with a nose 22 of an angular lever 23, pivoted at 23', which is controlled by the register mechanism (not shown) of the machine. At the beginning of a cycle of machine operation, the lever 23 is moved clockwise, for instance, by the crank or other drive of the machine or cash register. Then, the nose 22 enters between projections 21 and latches the arm 18 in the illustrated position. This prevents the key lock 20 from being operated during a machine operation. On the other hand, if after completion of a machine operation the key lock 20 is actuated and turned from its normal position, the lever 23 cannot operate because then one of projections 21 lies in the path of nose 22.

The apparatus as a whole functions as follows. As mentioned, the item counter reset arm 3 is normally latched by the latch lever 12 because, as long as the shutter plate 5 is in the raised position, the lever 6 cannot move the lever 12 to the released position. When the machine is not in operation, lock 20 can be turned by a key so that the link member 19 moves arm 18 and slider 14 with the attached shutter plate 5 downward to uncover the totalizer indicator. The nose of arm 6 now passes through recess 24 so that spring 11, acting through coupling spring 7 and pin 8, forces the pull rod 9 downward and disengages the latch lever 12 from latch pin 13. The reset arm 3, if desired, can now be moved upward for resetting the item counters to zero.

In the event the reset arm 3 is inadvertently not returned to the illustrated rest position before the shutter plate 5 has reached its effective, i. e. upward and closed position, it is still possible to return the reset arm 3 because pin 13 of arm 3 then glides along the latch nose of lever 12 and turns lever 12 clockwise while lowering the rod 9 against the force of coupling spring 7 as slot 10 is moving along pin 8.

It will be apparent to those skilled in the art that apparatus according to the invention can be modified as regards design, arrangement and number of individual parts and can be embodied in devices other than herein specifically disclosed, without departing from the object and essence of the invention and within the scope of the claims annexed hereto.

I claim:

1. Apparatus for a computing business machine, comprising totalizing indicator means having a shutter normally locked in indication-covering position and movable to an indication-uncovering position, a lock having a removable key and being linked with said shutter for moving, when operated by said key, said shutter to said uncovering position, item counter means having a reset handle manually movable between a rest position and a reset position, a movable latch normally in engagement with said handle to prevent moving said handle to said reset position, a control mechanism linked with said latch and having a member disposed to abut against said shutter when said shutter is in said covering position and movable into the path of said shutter when said shutter is in said uncovering position, said mechanism having a biasing spring forcing said mechanism member toward said shutter, whereby said mechanism releases said latch from said handle when said shutter is in said uncovering position.

2. Apparatus for a computing business machine, comprising totalizing indicator means having a shutter normally locked in indication-covering position and movable to an indication-uncovering position, item counter means having a reset handle manually movable between a rest position and a reset position, a movable latch normally in engagement with said handle to prevent moving said handle to said reset position, a latch control mechanism linking said latch with said shutter to release said latch from said handle when said shutter is in said uncovering position and comprising spring coupling means to permit returning said handle to said rest position when said shutter is in said covering position.

References Cited in the file of this patent

UNITED STATES PATENTS

| Number | Name | Date |
|---|---|---|
| 1,920,375 | Green | Aug. 1, 1933 |
| 2,050,065 | Pasinski | Aug. 4, 1936 |